Aug. 23, 1960
R. B. HELLER
2,949,769
SELF-BALANCING ULTRASONIC INSTRUMENT
Filed Jan. 20, 1956
2 Sheets-Sheet 1
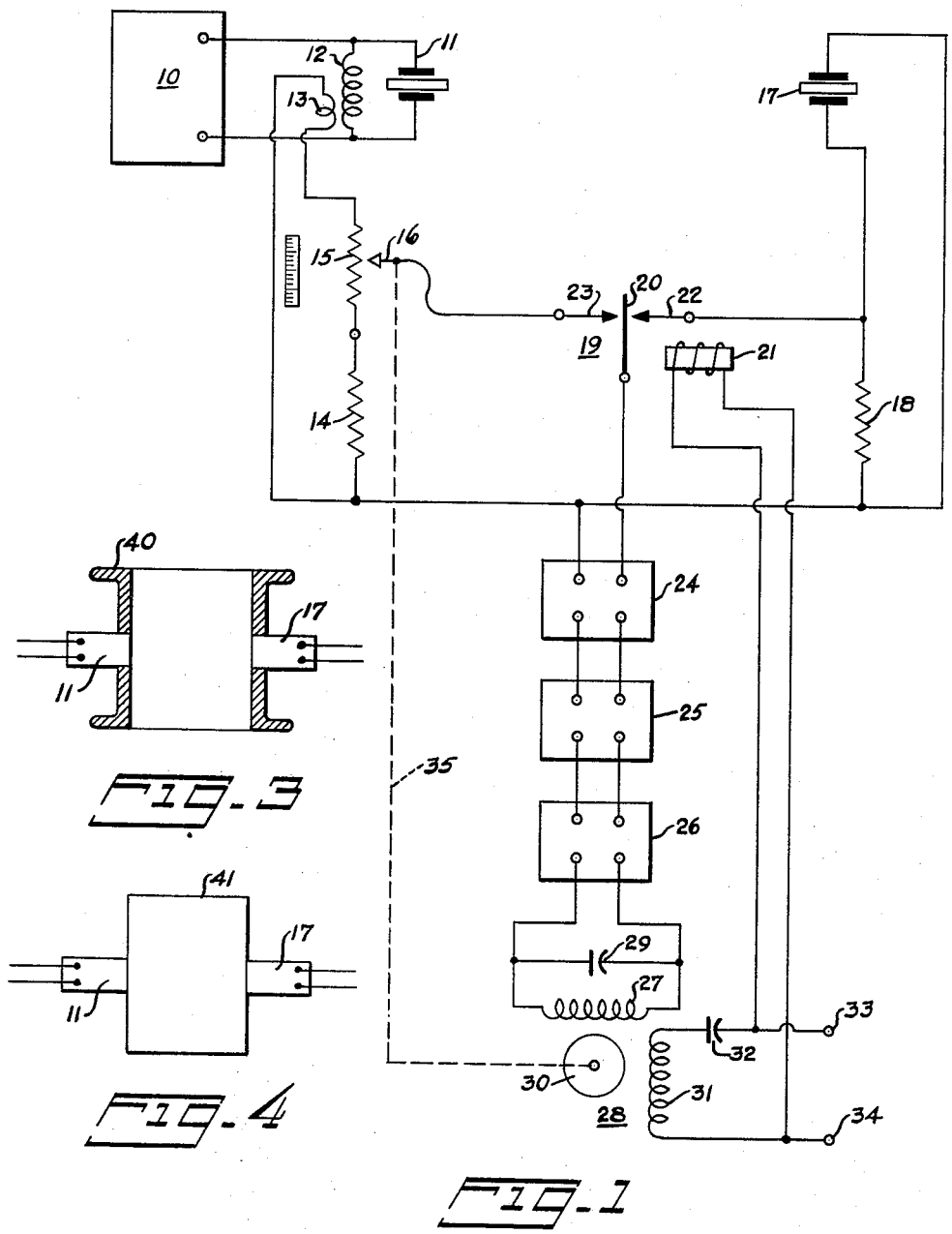
INVENTOR.
ROBERT B. HELLER
BY [signature]
AGENT

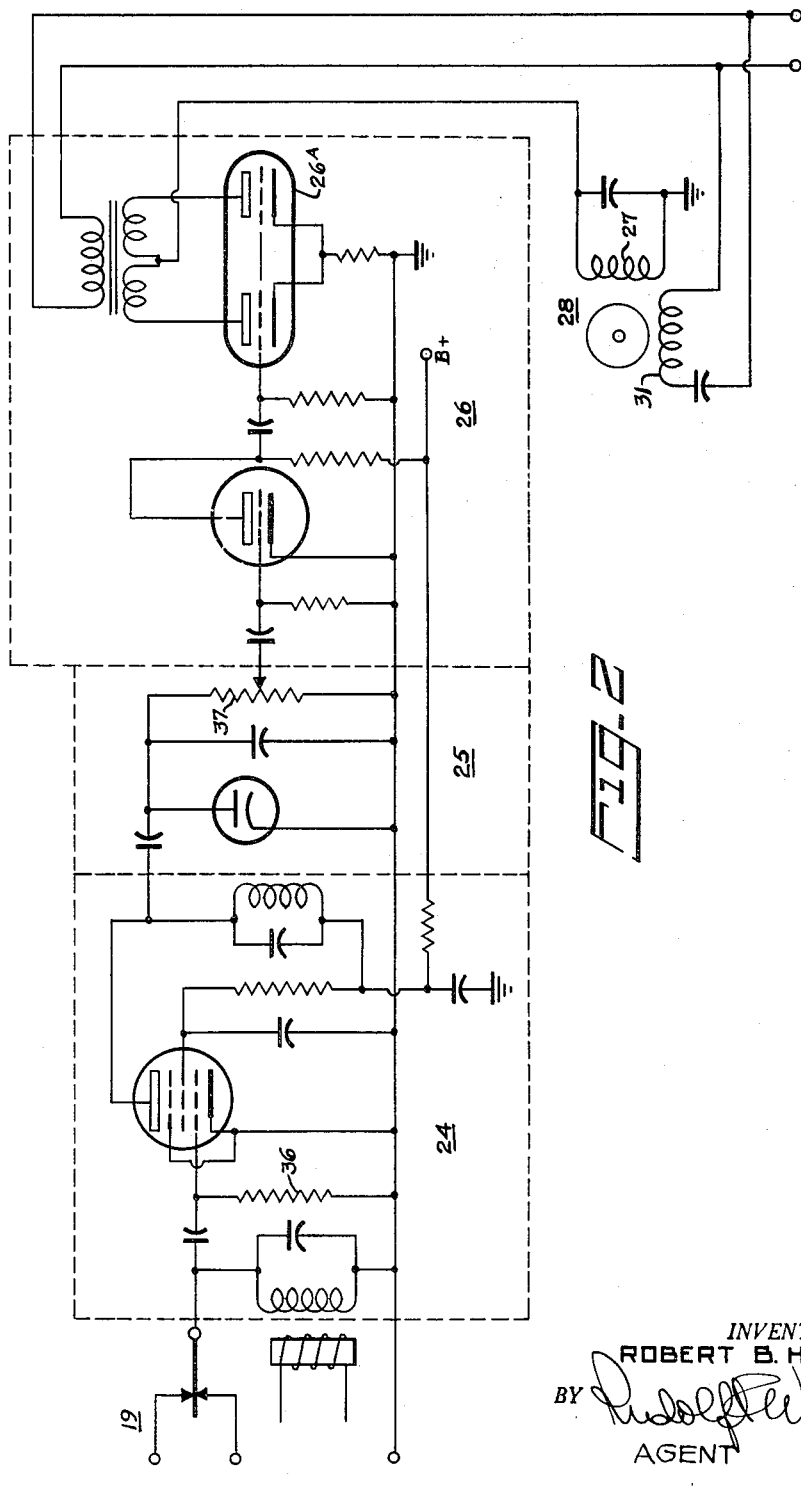

United States Patent Office 2,949,769
Patented Aug. 23, 1960

2,949,769

SELF-BALANCING ULTRASONIC INSTRUMENT

Robert B. Heller, Silver Spring, Md., assignor to Curtiss-Wright Corporation, a corporation of Delaware Filed Jan. 20, 1956, Ser. No. 560,327

1 Claim. (Cl. 73—67.6)

This invention relates to ultrasonic measuring apparatus for measuring a characteristic of materials under test or for measuring the concentration of one or more selected constituents in composite material. This invention is useful in various industries, such as, for example, the metal-working industry for controlling heat treatment by measurement of grain structure, or the paper industry in which it is necessary to measure the concentration of pulp in a water pulp slurry.

It has been found that the attenuation of ultrasonic energy transmitted through material depends upon certain characteristics of the material. Hence, measurement of the attenuation of such energy suffered by transmission through a path of predetermined length gives an indication of the characteristics of a single material or of the composition of composite material including materials with different absorption characteristics for ultrasonic energy.

In the past, arrangements for this purpose comprised a generator of electric oscillations coupled to a transducer for conversion of such oscillations to mechanical vibrations, which were imparted to the material under investigation. A second transducer was provided to intercept transmitted mechanical ultrasonic vibrations and convert them into electric oscillations, the amplitude of which was then measured. Such devices rely on the constancy of the amplitude of electric oscillations applied to the first transducer and upon the amplification of electrical signals throughout the arrangement, inasmuch as such instruments are of the deflectional type. Consequently, any change in the output of the generator of electric oscillations or changes in the sensitivity of the amplifiers in the instrument arrangement, such as caused by aging of vacuum tubes and changes in line voltage, will adversely affect the accuracy of such a measuring arrangement and give rise to spurious and faulty indications.

It is an object, therefore, of this invention to provide apparatus which overcomes the aforesaid weaknesses and of which the calibration is insensitive to the usually encountered changes in the electronic portion of the instrument and changes in operating voltage.

A further object of the present invention is to provide an instrument of the self-balancing or null-balance type for measuring attenuation of ultrasonic vibrations transmitted through material under test.

In accordance with the present invention, there is provided apparatus for measuring the attenuation of ultrasonic energy transmitted through material, comprising a generator of electric oscillations and a transducer for converting such oscillations into ultrasonic mechanical vibrations and for imparting the same to material under investigation. There is also provided a second transducer for intercepting ultrasonic vibrations transmitted through the material and converting them into second electric oscillations. Means are also provided to derive from said generator third electric oscillations. Means are further provided for periodically comparing the second and third oscillations, wherein the comparison of the two oscillations is a measure of the attenuation suffered by the ultrasonic vibrations in transmission through the material and, hence, an indication of the characteristics of the material under investigation.

In the accompanying drawings, Fig. 1 is a schematic circuit diagram of a self-balancing measuring instrument in accordance with the present invention, while Fig. 2 is a schematic diagram of a preferred embodiment of the electronic portion of the instrument. Fig. 3 schematically illustrates the arrangement of transducers in a section of a flow pipe for imparting ultrasonic vibrations to flowing material and for intercepting transmitted vibrations. Fig. 4 schematically illustrates the arrangement of transducers for measuring attenuation of ultrasonic energy transmitted through a metal block.

Referring now more particularly to Fig. 1 of the drawings, there is provided a generator 10 of electric oscillations of a frequency above the readily audible frequency range, the output of which is coupled to a transducer 11, which might use a piezoelectric quartz crystal, for converting electric oscillations into mechanical vibrations. Coupled to the output of generator 10 is also a primary inductance winding 12 coupled to a secondary inductance winding 13, the latter being connected in series relation with a fixed resistor 14 and a slide wire 15 with a slider 16. In this manner electric oscillations derived from the generator 10 and in a fixed amplitude relation thereto, are developed across slide wire 15 and resistor 14.

For the purpose of intercepting ultrasonic vibrations imparted to material (not shown) by transducer 11, there is provided a transducer 17 coupled to a resistor 18, across which electric oscillations are developed by transducer 17 in accordance with intercepted ultrasonic vibrations.

For comparing oscillations appearing across the combination of resistor 14 and a portion of slide wire 15 on one hand, and resistor 18 on the other hand, there is provided a chopper or vibrator generally indicated at 19, comprising a vibrating reed 20 energized by a winding and armature 21, and having contacts 22 and 23. Chopper or vibrator 19 is of conventional design, such as commonly used in industrial self-balancing D.-C. potentiometers. Contact 22 is connected to one terminal of resistor 18, while contact 23 is connected to slider 16 of slide wire 15.

The vibrating reed 20 of vibrator 19 is coupled to electric signal translating means and, more specifically, to the input terminals of a radio-frequency amplifier 24, for alternately amplifying signals applied to its input terminals from resistor 18 and the combination of resistor 14 and a portion of slide wire 15, respectively. For rectifying the oscillations amplified by amplifier 24, there is provided a rectifier unit 25, the demodulated low-frequency output signal from which is applied to a low-frequency amplifier 26 for amplification of the low-frequency control signal, which is produced when oscillations alternately applied to the input of amplifier 24 are of unequal amplitude. The output of amplifier 26 is coupled to one winding 27 of a motor generally indicated at 28. Parallel to winding 27, there is connected a capacitor 29, substantially forming a tuned circuit with motor winding 27, tuned to the same frequency at which the vibration reed 20 is excited. Motor 28 includes a rotor 30 and a second winding 31, which is connected by way of a capacitor 32 to terminals 33 and 34, which latter are connected to a power line. For the purpose of automatically null-balancing the instrument, a mechanical coupling indicated by the broken line 35 is provided between the rotor 30 of motor 28 and slider 16 associated with slide wire 15. An instrument pointer and, in the case of a recording instrument, a pen can be mechanically connected to slider 16 in any conventional manner and are, for the sake of simplicity, not shown.

Fig. 2 schematically shows in greater detail the radio-frequency amplifier 24, rectifier 25, and low-frequency amplifier 26, including a phase-sensitive output stage as shown. The circuits are of conventional design and, as will be apparent to those skilled in the art, can be replaced by other circuits performing the same tasks, without departing from the invention set forth herein. Therefore, only certain preferred features thereof will be pointed out. In the grid circuit of the amplifier tube of radio-frequency amplifier 24, there is preferably provided a grid resistor 36 of relatively high value, say ½ to 1 megohm, for the purpose of avoiding saturation of the radio-frequency amplifier in the case of an excessive amplitude of applied oscillations. A gain control potentiometer 37 is provided in the output circuit of rectifier 25 for the purpose of adjusting the over-all sensitivity of the instrument. The output stage of low-frequency amplifier 26 is phase-sensitive and comprises a twin tube 26A, whose plates are energized 180° out of phase and at the same frequency, namely, the power line frequency, at which the chopper 19 as well as the motor winding 31 of motor 28 are energized.

Fig. 3 shows a flow tube 40 in cross-section, which is provided with flanges, as shown, and can be welded or bolted into a flow line, through which fluid material under investigation is passed. Associated with flow tube 40 are transducers 11 and 17, corresponding to the transducers 11 and 17 of Fig. 1, attached to tube 40 in any suitable manner, whereby transducer 11 can impart ultrasonic vibrations to material (not shown) flowing through tube 40, and transducer 17 can intercept ultrasonic vibrations transmitted through the material.

Fig. 4 shows a block of metal 41, illustrating by way example a test piece, with transducers 11 and 17 for transmitting and receiving ultrasonic energy, respectively. The transducers are coupled to block 41 by way of an oil film or any other suitable coupling medium, as is well known in the art.

In operation, generator 10 of Fig. 1 generates electric oscillations of an ultrasonic frequency above the audible range, selected in accordance with the particular application, depending upon the material through which the attenuation is to be measured. The selection of frequency might also be governed by the amount of directivity desired of the ultrasonic beam generated, inasmuch as narrower beams are more readily generated at higher frequencies. The oscillations generated by generator 10 are applied to the first electromechanical transducer 11, which might have a quartz crystal or any other suitable element as its piezoelectric element, or might also be of the magnetostriction type. By means of inductance windings 12 and 13, a portion of the generator output voltage applied to transducer 11 is also applied to the series combination of resistor 14 and slide wire 15.

Ultrasonic vibrations imparted to material (not shown) by transducer 11 are intercepted by transducer 17, which preferably uses a piezoelectric element suitable for operating into a relatively low impedance, such as barium titanate. The material under investigation between transducers 11 and 17 is not shown, but Fig. 3, by way of example, shows preferred relative positions of transducers 11 and 17 in a flow pipe section 40, through which fluid material can flow, so that ultrasonic vibrations generated by transducer 11 are intercepted by transducer 17 after being attenuated in the course of their travel between transducers, and in accordance with characteristics of the material under test or, in accordance with the concentration of one or more selected constituents in composite material, whereby these constituents may cause an appreciably higher attenuation of the ultrasonic energy than the remainder of the composite material. Hence, the amplitude of the second electric oscillations produced across resistor 18 will be in a relation to the amplitude of the first oscillations applied to transducer 11 in accordance with the attenuation of the transmitted ultrasonic energy, and any changes in the amplitude of the second oscillations will be a measure of the changes in the aforesaid characteristics or concentration of constituents, as the case may be.

By properly selecting the respective numbers of turns of inductance windings 12 and 13, and the degree of electric coupling therebetween, the amplitude of oscillations generated across the combination of resistor 14 and slide wire 15 is made to be approximately equal to the amplitude of the second oscillations generated across resistor 18. Furthermore, the relative resistance values of elements 14 and 15 are preferably so chosen that the magnitude of the oscillations appearing across slide wire 15 alone corresponds to the change in magnitude of the oscillations across resistor 18 expected for the full range of changes in attenuation of ultrasonic energy between transducers 11 and 17.

Vibrator 19 is energized by power line voltage applied to the coil and armature 21, so that the vibrating reed 20 alternately makes contact with contacts 22 and 23, respectively. Reed 20, when energized from a 60 cycle power line, will dwell approximately one-half cycle of the line frequency on each of the contacts 22 and 23, respectively. In this manner, the input circuit of radio-frequency amplifier 24 is alternately connected to resistor 18 and slider 16, respectively, thereby alternately applying the second oscillations produced across resistor 18 and the third oscillations appearing between slider 16 and the remote terminal of resistor 14, to the radio-frequency amplifier 24. After amplification of the radio frequency signals, these signals are rectified or demodulated by rectifier 25.

If now, the amplitudes of the oscillations across resistor 18 and between slider 16 and the remote end of resistor 14, that is, the second and third oscillations, respectively, are unequal, a 60 cycle square wave will be produced at the output of rectifier 25 as its demodulation product. The phase of this control signal, a 60 cycle square wave, depends on the relative amplitudes of the second or third oscillations. In case the amplitudes of the second and third oscillations are equal, the demodulation product has no alternating components and no control signal is produced.

The 60 cycle output signal from rectifier 25 is amplified by means of low frequency amplifier 26 and is applied to the parallel combination of motor winding 27 and capacitor 29, producing a 60 cycle motor control voltage depending in phase upon the relative magnitude of the amplitudes of the second and third oscillations. The second winding 31 of motor 28 is energized directly from the power line connected at terminals 33 and 34 through capacitor 32. The rotor 30 of motor 28 rotates in a direction depending upon the phase of the control voltage developed across winding 27, and correspondingly moves through mechanical coupling 35 and slider 16 in one direction, or in the opposite direction, until the amplitudes of the second and third oscillations, appearing across resistor 18 and between slider 16 and the remote end of resistor 14, respectively, are equal. In that case no control signal, that is, no A.-C. component in the output of rectifier 25, is produced, and the system is balanced.

Obviously the position of slider 16 corresponds to the magnitude of the oscillations appearing across resistor 18, which, in turn, are a measure of the attenuation of the ultrasonic energy transmitted from transducer 11 to transducer 17. The measured attenuation can be correlated with characteristics of the material between transducers 11 and 17, or with the concentration of one or more selected constituents in composite material between these transducers. Hence, the position of slider 16, and the position of a pointer or pen (not shown) of an indicating or recording instrument can be calibrated in terms of concentration or in terms of a material characteristic, such as internal grain structure, which is known to alter ultrasonic attenuation, depending upon grain size.

Referring now to Fig. 2, the specific features previously mentioned will be discussed in greater detail. The signal translating means comprising amplifier 24, rectifier 25, and low-frequency amplifier 26, are all of conventional design and are shown by way of example only. Specifically, radio-frequency amplifier 24 is equipped with the grid leak resistor 36 connected in the control grid circuit of the single amplifier tube shown, for the purpose of preventing saturation of this amplifier in case the radio-frequency signals applied to this grid should be of sufficient amplitude normally to drive this tube to saturation. Saturation of this tube by the two signals alternately applied thereto by the vibrator 19, would cause a loss of the information used to develop a control signal, since the tube would then act as an amplitude limiter. This feature is not essential as long as the amplitude of oscillations developed across the combination of resistor 14 and slide wire 15 of Fig. 1 is insufficient to cause saturation of the amplifier 24. This feature, therefore, is provided solely as a safeguard in case of inadvertent misadjustment of the instrument.

The potentiometer 37 provided in the output circuit of rectifier 25 has for its purpose the adjustment of the sensitivity of the electric signal translating means, thereby permitting proper adjustment of the sensitivity of the feedback loop in the instrument to avoid an excessive dead zone of the instrument as well as self-oscillations or hunting thereof.

The output stage of low-frequency amplifier 26 includes a twin tube 26A connected as shown to the control grids of which low-frequency signals are applied in phase, whereas anode voltages are applied out of phase. This arrangement is known to produce an output voltage across motor winding 27 of one phase or of opposite phase, depending upon the phase of the signal applied to the control grids of the twin tube 26A. In the absence of a control signal applied to the grids of tube 26A, a strong voltage component of twice line frequency is developed across motor winding 27 as well as a D.-C. voltage component. This has certain beneficial effects on the operation of the motor, particularly with regard to motor damping, as is well known in the art.

The operations of the arrangements of Figs. 3 or 4 are virtually self-explanatory. In the arrangement of Fig. 3, fluid material flows vertically through pipe section 40 filling the interior space between transducers 11 and 17. By direct contact with the fluid material, ultrasonic energy generated by transducer 11 is imparted to the material, transmitted therethrough and intercepted by transducer 17. It is well known that various substances produce different degrees of attenuation of ultrasonic energy transmitted therethrough. For example, paper pulp attenuates ultrasonic vibration to a considerably greater degree than water. Hence, it is possible to detect the concentration of paper pulp in water simply by measuring the attenuation of ultrasonic energy transmitted through a composite slurry of water and paper pulp. Obviously, by passing various slurries of known concentration through pipe section 40, it is possible to measure the attenuation as a function of pulp concentration, and thereby to calibrate the instrument of the present invention.

It is also well known that the coarseness of grain structure in metals considerably influences the attenuation of ultrasonic vibrations transmitted through such metal. It is also known that grain structure and grain size is an indication of heat treatment history of steel, for example. Consequently, if ultrasonic energy is transmitted through metal pieces, such as schematically illustrated by the block 41 of Fig. 4, the attenuation thereof can be measured and the instrument can be calibrated by using reference test pieces with a known heat treatment history. It is then possible to use the instrument for production quality control, inasmuch as, when suitably calibrated, it can detect work pieces which have been overheated and, therefore, have a coarse grain structure.

While there has been described what is at present considered to be the preferred embodiment of this invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

Apparatus for measuring the attenuation of ultrasonic energy transmitted through material, comprising a generator of electrical oscillations, a first transducer for converting said oscillations into ultrasonic vibrations and adapted to transmit said vibrations through material under test, a second transducer adapted to intercept vibrations transmitted through said material for converting said intercepted vibrations into second electric oscillations, a resistor combination including slide wire and a slider, means for developing across said combination third oscillations derived from said generator having a preselected amplitude in relation to the amplitude of said second electric oscillations obtained from a predetermined standard, electric signal translating means having input and output terminals, a vibrating contactor for alternately applying said second and said third oscillations to said input terminals, actuating means coupled to said output terminals and controlled by the output signals from said translating means for actuating said slider automatically to adjust said preselected amplitude to equal the amplitude of the then occurring second oscillations and means for indicating the position of said slider.

References Cited in the file of this patent
UNITED STATES PATENTS

| | | |
|---|---|---|
| 2,476,496 | Kliever | July 19, 1949 |
| 2,527,208 | Berry et al. | Oct. 24, 1950 |
| 2,612,772 | McConnell | Oct. 7, 1952 |
| 2,622,192 | Tarpley | Dec. 16, 1952 |
| 2,768,524 | Beard | Oct. 30, 1956 |
| 2,823,351 | Page | Feb. 11, 1958 |

FOREIGN PATENTS

| | | |
|---|---|---|
| 865,995 | Germany | Feb. 5, 1953 |